United States Patent [19]

Otsuka et al.

[11] 4,371,822
[45] Feb. 1, 1983

[54] CONTROL DEVICE FOR PULSE MOTORS, HAVING A FAIL SAFE FUNCTION

[75] Inventors: Kazuo Otsuka, Higashikurume; Shin Narasaka, Yono; Shumpei Hasegawa, Niiza, all of Japan

[73] Assignee: Honda Motor Co., Ltd., Tokyo, Japan

[21] Appl. No.: 296,015

[22] Filed: Aug. 25, 1981

[30] Foreign Application Priority Data

Aug. 29, 1980 [JP] Japan .................... 55-120144

[51] Int. Cl.³ .......................... H02K 29/04
[52] U.S. Cl. ........................ 318/696; 318/685; 123/440
[58] Field of Search ........... 340/501, 506, 517, 642, 340/650, 652; 318/696, 685; 123/589, 440

[56] References Cited

U.S. PATENT DOCUMENTS 3,801,975 4/1974 Kitano ........................ 340/251
4,321,643 3/1982 Vernier ........................ 361/48

Primary Examiner—J. V. Truhe
Assistant Examiner—S. M. Bergmann
Attorney, Agent, or Firm—Arthur L. Lessler

[57] ABSTRACT

A control device for a pulse motor having a plurality of polyphase stator coils, which includes a driving circuit having a plurality of power transistors arranged for sequentially energizing the stator coils, an abnormality detecting circuit arranged for comparing the input and output levels of the transistors to produce an output when the two levels are out of an inverted relationship, and a timer circuit arranged for producing a fault signal when the output of the abnormality detecting circuit is continuously produced over a predetermined period of time. The pulse motor control device may also include an alarm device and a safety device, both responsive to the output of the timer circuit to give the alarm and render the power transistors inoperative, respectively.

8 Claims, 3 Drawing Figures

4,371,822

CONTROL DEVICE FOR PULSE MOTORS, HAVING A FAIL SAFE FUNCTION

BACKGROUND OF THE INVENTION

This invention relates to a control device for driving or controlling the operation of a pulse motor, and more particularly to such control device which has a fail safe function of detecting abnormality in the pulse motor and taking necessary safe actions.

Conventionally, many control systems and driving systems have been proposed and actually used, which use pulse motors as actuators or the like.

For instance, an air/fuel ratio control system for controlling by means of feedback the air/fuel ratio of an air/fuel mixture being supplied to an internal combustion engine, to a predetermined value has been proposed by the assignee of the present application, which includes a valve connected to fuel quantity adjusting means such as a carburetor for controlling the air/fuel ratio of the mixture. The valve is controlled by a pulse motor used as the actuator for the valve, in response to a control signal outputted from an electronic control unit as a function of the concentration of an exhaust gas ingredient emitted from the engine.

The pulse motors used in many control systems and driving systems inclusive of the above air/fuel ratio control system are generally each comprised of a stator having a plurality of coils wound on its salient poles in a polyphase manner and a rotor formed with a plurality of salient poles, around which the stator is disposed. The coils wound on the stator are sequentially energized by means of an electronic control circuit, to cause each of the salient poles of the rotor to be magnetically attracted toward a corresponding one of the salient poles of the stator to thereby cause rotation of the rotor. In a pulse motor constructed above, if even a single one of the polyphase coils malfunctions due to disconnection fault in the coil per se or disconnection fault or short-circuit in the wiring system, or if a power transistor used in the electronic control circuit for energizing the coil becomes defective, there occurs a malfunction of the pulse motor such as stoppage and reversal. Particularly in the aforementioned air/fuel ratio control system, if no safety measure is taken in such an event, the air/fuel ratio of the mixture can be controlled to an improper value, which would have an unfavorable influence upon the driveability and exhaust emission characteristics of the engine.

OBJECTS AND SUMMARY OF THE INVENTION

It is an object of the invention to provide a control device for a pulse motor, which includes a plurality of power transistors arranged to sequentially energize the polyphase stator coils of the pulse motor and is adapted to positively detect without fail a failure in the pulse motor and the pulse motor driving system by detecting abnormality in the logical relationship between the input and output levels of each of the power transistors.

It is a further object of the invention to provide a control device for a pulse motor, which is adapted to render the above power transistor inoperative when the abnormality in the logical relationship between input and output levels thereof continuously exists over a predetermined period of time, and, if necessary, give the alarm and display the occurrence of the failure.

According to the invention, there is provided a control device for driving a pulse motor having a stator and a plurality of coils wound on the stator in a polyphase arrangement. The control device comprises: a driving circuit having a plurality of power transistors each connected to a corresponding one of the stator coils of the pulse motor; an abnormality detecting circuit arranged to compare the level of an input applied to each of the power transistors with the level of an output of the each power transistor and generate an output when the two levels are out of a predetermined relationship; and a timer circuit arranged to generate a signal when the output of the abnormality detecting circuit is continuously generated over a predetermined period of time.

The pulse motor control device may further include an alarm device and a safe device which are both responsive to the above signal generated by the timer circuit to give the alarm and render the power transistors of the driving circuit inoperative, respectively.

The above and other objects, features and advantages of the invention will be more apparent from the ensuing detailed description taken in connection with the accompanying drawings in which:

BRIEF DESCRIPTION OF THE DRAWINGS

FIG. 3 is a graph showing the operation of the control device of FIG. 2.

DETAILED DESCRIPTION

Details of the invention will now be described with reference to the drawings.

Figure 1:
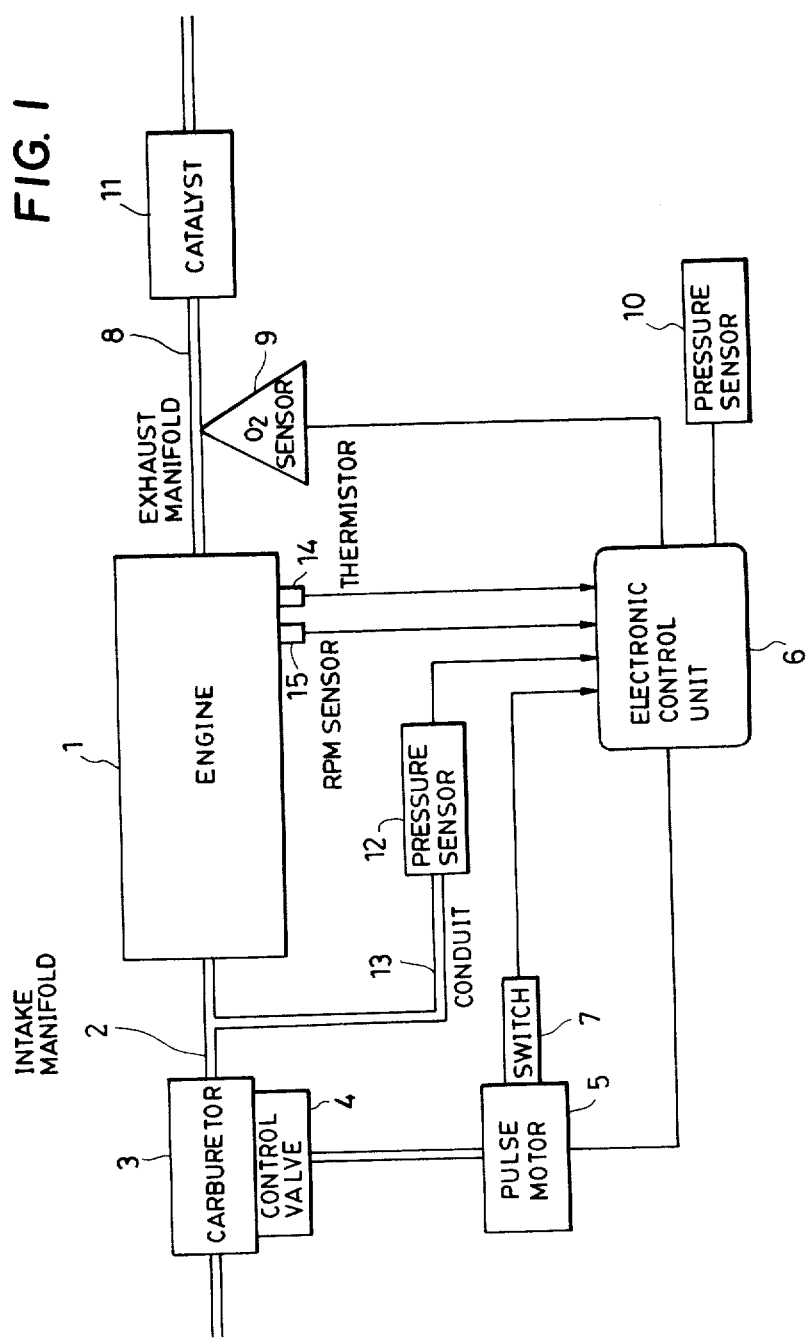
FIG. 1 is a block diagram illustrating the whole arrangement of an air/fuel ratio control system to which is applicable the pulse motor control device according to the invention.

Referring first to FIG. 1, there is illustrated a block diagram of the whole arrangement of an air/fuel ratio control system to which the pulse motor control device according to the invention is applicable. Reference numeral 1 designates an internal combustion engine. Connected to the engine 1 is an intake manifold 2 which is provided with a carburetor generally designated by the numeral 3. The carburetor 3 has main and slow speed fuel passages, not shown, which communicate the float chamber, not shown, of the carburetor 3 with primary and secondary bores, not shown. These fuel passages communicate with the atmosphere by means of air bleed passages, not shown. The air bleed passages introduce atmospheric air into the fuel passages for mixing the introduced air with the fuel therein, so that fuel is supplied to the engine 1 in quantities substantially inversely proportional to those of the introduced air.

At least one of these air bleed passages is connected to an air/fuel ratio control valve 4. The air/fuel ratio control valve 4 is comprised of a required number of flow rate control valves, not shown, each of which is driven by a pulse motor 5 so as to vary the opening of the at least one of the above passages. The pulse motor 5 is electrically connected to an electronic control unit (hereinafter called "ECU") 6 to be rotated by driving pulses supplied therefrom so that the flow rate control valves are displaced to vary the flow rate of bleed air for control of the flow rate of fuel being supplied to the engine 1 through the at least one passage. Although it is preferable to vary the flow rate of bleed air by means of the flow rate control valve 4 in the above manner to control the flow rate of fuel being supplied to the engine 1, that is, the air/fuel ratio, alternatively the air/fuel ratio may be controlled by directly varying the flow rate of fuel, in place of the flow rate of bleed air. In this alternative case, the air/fuel ratio control valve 4 may be arranged to vary the opening of at least one of the above fuel passages, for control of the flow rate of fuel flowing in the fuel passages.

The pulse motor 5 is provided with a reed switch 7 which is arranged to turn on or off depending upon the moving direction of the valve body of the air/fuel ratio control valve 4 each time the same valve body passes a reference position, to supply a corresponding binary signal to ECU 6.

On the other hand, an $O_2$ sensor 9, which is formed of stabilized zirconium oxide or the like, is mounted in the peripheral wall of an exhaust manifold 8 leading from the engine 1 in a manner projected into the manifold 8. The sensor 9 is electrically connected to ECU 6 to supply its output signal thereto. An atmospheric pressure sensor 10 is arranged to detect the ambient atmospheric pressure surrounding the vehicle, not shown, in which the engine 1 is installed, the sensor 10 being electrically connected to ECU 6 to supply its output signal thereto, too.

Incidentally, in FIG. 1, reference numeral 11 designates a three-way catalyst, 12 a pressure sensor arranged to detect the absolute pressure in the intake manifold 2 through a conduit 13 and electrically connected to ECU 6 to supply its output signal thereto, and 14 a thermistor arranged to detect the temperature of engine cooling water and electrically connected to ECU 6 to supply its output signal thereto. A distributor and an ignition coil are generally designated by the numeral 15, which cooperate to form an engine rpm sensor for supplying pulses produced in the ignition coil to ECU 6.

Details of the air/fuel ratio control which can be performed by the air/fuel ratio control system outlined above will now be described.

At the start of the engine, ECU 6 once moves the rotor of the pulse motor to its reference position and then moves it to a predetermined position best suitable for the startability of the engine 1 (a preset position) (hereinafter called "$PS_{CR}$"), thus setting the air/fuel ratio to a predetermined proper value.

Then, ECU 6 monitors the condition of activation of the $O_2$ sensor 9 and the engine coolant temperature Tw detected by the thermistor 14 and judges that the condition of initiation of the air/fuel ratio has been fulfilled when the $O_2$ sensor 9 is fully activated and the engine is in a warmed-up state.

During the above stage of detection of activation of the $O_2$ sensor and the coolant temperature Tw, the rotor of the pulse motor 5 is held at the aforementioned predetermined position $PS_{CR}$. From this position, it is driven to appropriate positions in response to the operating condition of the engine after initiation of the air/fuel ratio control hereinlater described.

Following the initialization, the program in ECU 6 proceeds to the basic air/fuel ratio control.

ECU 6 is responsive to various detected value signals representing the output voltage of the $O_2$ sensor 9, the absolute pressure in the intake manifold 2 detected by the pressure sensor 12, the engine rpm Ne detected by the rpm sensor 15, and the atmospheric pressure detected by the atmospheric pressure sensor 10, to drive the pulse motor 5 as a function of these signals to control the air/fuel ratio. More specifically, the basic air/fuel ratio control comprises open loop control which is carried out at wide-open-throttle, at engine idle, and at engine deceleration, and closed loop control which is carried out at engine partial load. All the control is initiated after completion of the warming-up of the engine.

To obtain optimum exhaust emission characteristics irrespective of changes in the actual atmospheric pressure during open loop air/fuel ratio control or at the time of shifting from open loop mode to closed loop mode, the position of the rotor of the pulse motor 5 needs to be compensated for atmospheric pressure.

During the closed loop control, ECU 6 performs selectively feedback control based upon proportional term correction (hereinafter called "P term control") and feedback control based upon integral term correction (hereinafter called "I term control"), in response to the engine rpm Ne detected by the engine rpm sensor 15, and the output signal V of the $O_2$ sensor 9. To be concrete, the integral term correction is used when the output voltage of the $O_2$ sensor 9 varies only at the higher level side or only at the lower level side with respect to a reference voltage Vref, wherein the position of the rotor of the pulse motor 5 is corrected by an integral value obtained by integrating the value of a binary signal which changes in dependence on whether the output voltage V of the $O_2$ sensor is at the higher level or at the lower level with respect to the predetermined reference voltage Vref. On the other hand, when the output signal V of the $O_2$ sensor changes from the higher level to the lower level or vice versa, the proportional term correction is carried out wherein the position of the rotor of the pulse motor 5 is corrected by a value directly proportional to a change in the output voltage of the $O_2$ sensor.

According to the above I term control, the number of steps by which the rotors of the pulse motor is to be displaced per second increases with an increase in the engine rpm so that it becomes larger in a higher engine rpm range. Whilst, according to the P term control, the number of steps by which the rotor of the pulse motor is to be displaced is set at a single predetermined value (e.g., 6 steps), irrespective of the engine rpm.

Figure 2:
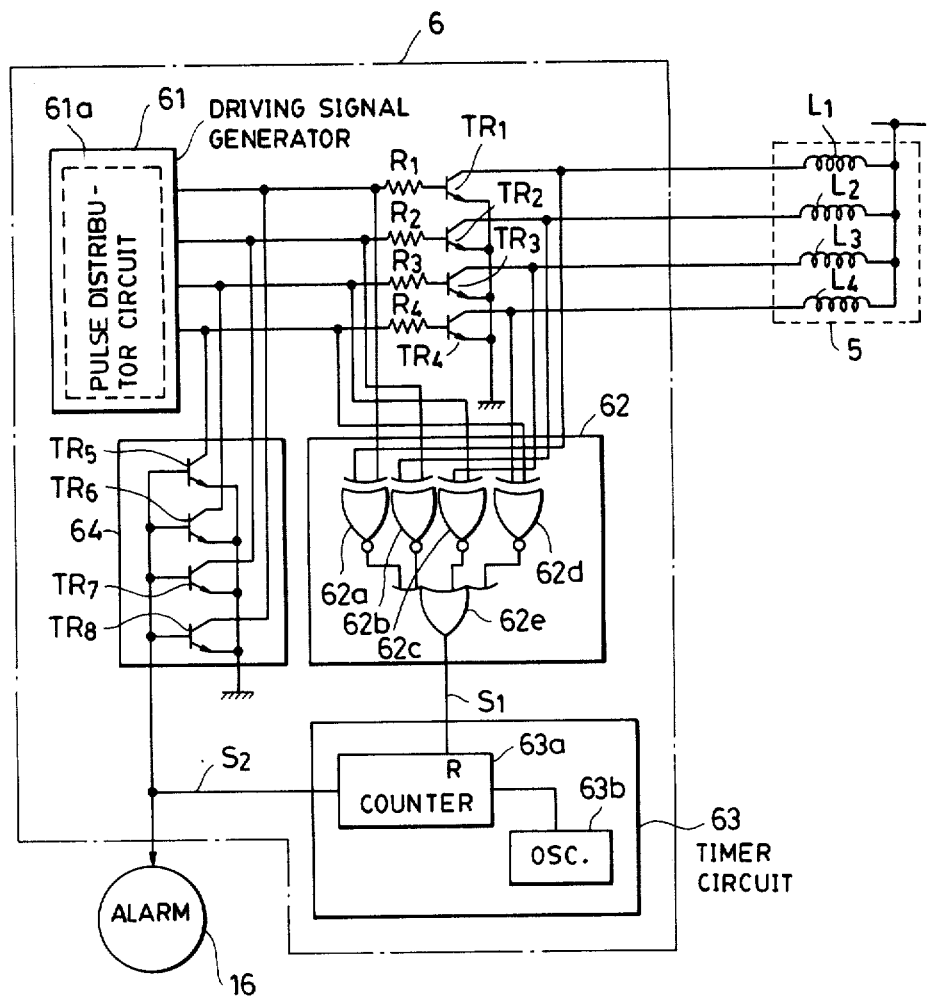
FIG. 2 is a circuit diagram illustrating in detail the pulse motor control device according to the invention.

Referring next to FIG. 2, there is illustrated a circuit diagram of an embodiment of the pulse motor control device according to the invention, which is provided within ECU 6 in FIG. 1. Reference numeral 61 designates a driving signal generator adapted to produce a driving signal for the pulse motor 5 which driving signal is a function of the operating condition of the engine 1 and produced in accordance with programming of the air/fuel ratio control previously described with reference to FIG. 1. The generator 61 may have a conventional internal construction and function substantially identical with that shown in FIG. 2 of U.S. Pat. No. 4,036,186 issued July 19, 1977 to Hattori et al., and described in column 5 thereof at lines 13 to 48. The generator 61 has a built-in pulse distributor circuit 61a which has output terminals corresponding in number to the stator coils $L_1$-$L_4$ of the pulse motor 5 (four in the illustrated embodiment), and through which driving pulses of the driving signal are generated. The above output terminals of the generator 61 are connected to the bases of corresponding ones of NPN type power transistors $TR_1$-$TR_4$ which are connected in parallel with each other and correspond in number to the above stator coils. Incidentally, current limiting resistances $R_1$–$R_4$ are interposed between the output terminals of the generator 61 and the bases of the power transistors. The power transistors $TR_1$–$TR_4$ have their emitters grounded and their collectors connected to ends of corresponding ones of the stator coils $L_1$–$L_4$ are connected to a suitable positive voltage power source, not shown.

Reference numeral 62 designates a logical abnormality detecting circuit as a whole, which comprises four exclusive NOR circuits 62a–62d arranged in parallel with each other and an OR circuit 62e. The exclusive NOR circuits 62a–62d each have one input terminal connected to the base of a corresponding one of the transistors $TR_1$–$TR_4$, more specifically, connected to the lead connecting between the resistances $R_1$–$R_4$ and the output terminals of the driving signal generator 61, and the other input terminal to the collector of the corresponding transistor, respectively.

The output terminals of these exclusive NOR circuits 62a–62d are connected to the input of the OR circuit 62e which in turn has its output terminal connected to the reset pulse-input terminal R of a counter 63a which forms part of a timer circuit generally designated by the numeral 63. This counter 63a is adapted to be resetted when its reset pulse-input terminal R is supplied with a binary signal of 0. The counter 63a has its counting pulse-input terminal connected to the output of an oscillator 63b which is adapted to produce pulses with a constant period. The counter 63a is adapted to continuously produce a binary output of 1 upon counting up a predetermined number of pulses supplied from the oscillator 63b, which corresponds to a predetermined period of time ta, described hereinlater.

Reference numeral 64 designates a safety device which comprises a plurality of NPN type transistors $TR_5$–$TR_8$ corresponding in number to the power transistors $TR_1$–$TR_4$ and arranged in parallel with each other. These transistors $TR_5$–$TR_8$ have their bases connected to the output of the counter 63a, their collectors to corresponding ones of the output terminals of the driving signal generator 61, and their emitters grounded, respectively.

Also connected to the output of the counter 63a is an alarm device 16 which is adapted to produce an alarm signal when supplied with a binary output of 1 from the counter 63a.

The operation of the pulse motor control device arranged above according to the invention will now be described. The pulse distributor circuit 61a in the driving signal generator 61 generates driving pulses through its output terminals in a predetermined sequence, in response to the operating condition of the engine 1, to apply the generated driving pulses to the power transistors $TR_1$–$TR_4$ to energize the same in the predetermined sequence so that the stator coils $L_1$–$L_4$ of the pulse motor 5 are sequentially energized to cause rotation of the rotor, not shown, of the pulse motor 5.

In normal operation when no abnormality exists in any of the power transistors $TR_1$–$TR_4$, the stator coils $L_1$–$L_4$ of the pulse motor 5, the wiring between the power transistors and the stator coils and the wiring in the feeding system for the stator coils, the input signal voltage applied to the bases of the transistors $TR_1$–$TR_4$ and the output signal voltage applied to the collectors thereof are in a relationship inverted with respect to each other, that is, in such a relationship that when one of the input and output signal voltages is at a high level, the other is at a low level.

Therefore, in normal operation, the exclusive NOR circuits 62a–62d of the logical abnormality detecting circuit 62 each have its two input terminals supplied with different level voltages and accordingly generates a binary output of 0. The binary outputs of 0 of the exclusive NOR circuits 62a–62d are sequentially applied to the OR circuit 62e which in turn successively applies outputs $S_1$ of 0 to the reset pulse-input terminal R of the counter 63a. Since the counter 63a is adapted to be resetted by a binary signal of 0 applied to its input terminal R as previously noted, it has its count value held at zero to generate an output $S_2$ of 0 even when its counting pulse-input terminal is supplied with pulses from the oscillator 63b.

When abnormality occurs in the power transistors $TR_1$–$TR_4$, the stator coils $L_1$–$L_4$ of the pulse motor 5, the wiring connecting between the power transistors and the stator coils, the wiring in the feeding system for the stator coils, etc., one of the exclusive NOR circuits 62a–62d has its two input terminals supplied with respective binary inputs of 1 or 0 which are equal in level. Consequently an output $S_1$ of 1 is outputted from the NOR circuit to the reset pulse-input terminal R of the counter 63a through the OR circuit 62e. The counter 63a is thus released from its resetted state to start counting pulses generated by the oscillator 63b. Upon counting up the predetermined number of pulses corresponding to the predetermined period of time ta (e.g., 2 seconds), the counter 63a generates an output $S_2$ of 1 (FIG. 3). This output $S_2$ of 1 is applied to the alarm device 16 to actuate the same, while simultaneously it is also applied to the common bases of the transistors $TR_5$–$TR_8$ of the safety device 64 to turn them on so that the output terminals of the driving signal generator 61 are shorted to the ground through the transistors $TR_5$–$TR_8$ to render the transistors $TR_1$–$TR_4$ inoperative. When the duration of occurrence of the output $S_1$ of 1 outputted from the logical abnormality detecting circuit 62 is shorter than the predetermined period of time ta, the counter 63a does not produce the output $S_2$ of 1 (FIG. 3) so that the power transistors $TR_1$–$TR_4$ continue to operate normally. That is, in order to avoid the possibility that the safety device 64 is actuated due to noise or other inappreciable factors, which can lead to unstable air/fuel ratio control operation, the above predetermined period of time ta is provided which is sufficiently long for determination of a substantial failure in the pulse motor control system.

Incidentally, although the circuits 62–64 forming the fail safe system for the pulse motor are arranged within ECU 6 in the illustrated embodiment, part or all of these circuits may be arranged outside ECU 6, if necessary. Also, suitable fault display means may be added in the illustrated arrangement, if required.

While a preferred embodiment has been described, variations thereto will occur to those skilled in the art within the scope of the present inventive concepts which are delineated by the following claims.

What is claimed is:

1. A control device for driving a pulse motor having a stator and a plurality of stator coils wound on said stator in a polyphase arrangement, said control device comprising:
 a driving circuit comprising:
  generator means having a plurality of output terminals and adapted to generate driving pulses at said output terminals in a predetermined sequence, and a plurality of power transistors, each having (i) an input terminal coupled to a corresponding one of said output terminals of said generator means, and (ii) an output terminal at which the power transistor is adapted to generate an output signal having a level which is in a predetermined relationship with the level of an input signal applied to the input terminal thereof, the output terminal of each power transistor being coupled to a corresponding one of said stator coils of said pulse motor, said power transistors being sequentially energized by said driving pulses generated by said generator means in said predetermined sequence to sequentially energize said stator coils;

an abnormality detecting circuit for (i) comparing the level of the input signal applied to the input terminal of each of said power transistors with the level of the output signal at the output terminal thereof and (ii) generating a malfunction indicating signal when said two levels are out of said predetermined relationship; and a timer circuit coupled to said abnormality detecting circuit for generating a warning signal when said malfunction indicating signal is continuously generated over a predetermined period of time.

2. The control device according to claim 1, further comprising alarm means arranged for actuation in response to said warning signal.

3. The pulse motor control device as claimed in claim 1, further comprising means responsive to said warning signal generated by said timer circuit to render said power transistors inoperative.

4. The pulse motor control device as claimed in claim 1, 2 or 3 wherein said abnormality detecting circuit comprises a plurality of exclusive NOR circuits, each having one input terminal thereof connected to the input of a corresponding one of said power transistors and another input terminal thereof to the output of said corresponding power transistor, and an OR circuit arranged to be supplied with an output produced by said exclusive NOR circuits.

5. The control device according to claim 1, 2, or 3 wherein each of said power transistors is adapted to generate at the output terminal thereof an output having a level which is inverted with respect to the level of the input signal applied to the input terminal thereof.

6. In an internal combustion engine having an air/fuel ratio control system including a pulse motor having a rotor for controlling the air/fuel ratio in accordance with the position of said rotor, said pulse motor also having a stator and a plurality of stator coils wound on said stator in a polyphase arrangement, a control device for driving said pulse motor, said control device comprising:

pulse generating means for providing drive pulses at each of a plurality of output terminals thereof, the drive pulses at each output terminal occurring sequentially with respect to the drive pulses at each of the other output terminals, in a predetermined sequence;

a plurality of power amplifying elements each having (i) an input terminal connected to a corresponding output terminal of said pulse generating means for receiving drive pulses therefrom, and (ii) an output terminal connected to a corresponding one of said stator coils for delivering power pulses thereto, said power pulses normally being substantially out of phase with said drive pulses;

an abnormality detecting circuit coupled to the input and output terminals of each of said power amplifying elements for generating a malfunction indicating signal whenever the power pulses at the output terminal of one of said elements are not substantially out of phase with the drive pulses at the input terminal thereof; and a timer circuit for generating a warning signal whenever said malfunction indicating signal persists for a predetermined period of time.

7. The control device according to claim 8, wherein said power amplifying elements are power transistors, further comprising means responsive to said warning signal for rendering said power transistors inoperative.

8. In an internal combustion engine having an air/fuel ratio control system including a pulse motor having a rotor for controlling the air/fuel ratio in accordance with the position of said rotor, said pulse motor also having a stator and a plurality of stator coils wound on said stator in a polyphase arrangement, a control device for driving said pulse motor, said control device comprising:

pulse generating means for providing drive pulses at each of a plurality of output terminals thereof, the drive pulses at each output terminal occurring sequentially with respect to the drive pulses at each of the other output terminals, in a predetermined sequence;

a plurality of power amplifying elements each having (i) an input terminal connected to a corresponding output terminal of said pulse generating means for receiving drive pulses therefrom, and (ii) an output terminal connected to a corresponding one of said stator coils for delivering power pulses thereto, the power pulses delivered by each of said power amplifying elements normally having a given phase relationship with respect to the drive pulses supplied thereto;

an abnormality detecting circuit coupled to the input and output terminals of each of said power amplifying elements for generating a malfunction indicating signal whenever the power pulses at the output terminal of one of said elements do not have said given phase relationship with respect to the drive pulses at the input terminal thereof; and a timer circuit for generating a warning signal whenever said malfunction indicating signal persists for a predetermined period of time.

* * * * *